United States Patent [19]

Grossman et al.

[11] Patent Number: 5,131,991
[45] Date of Patent: Jul. 21, 1992

[54] AUTOMATED PRODUCT RECOVERY IN A HG-196 PHOTOCHEMICAL ISOTOPE SEPARATION PROCESS

[75] Inventors: Mark W. Grossman, Belmont; Richard Speer, Reading, both of Mass.

[73] Assignee: GTE Products Corporation, Danvers, Mass.

[21] Appl. No.: 708,797

[22] Filed: May 30, 1991

Related U.S. Application Data

[63] Continuation of Ser. No. 435,444, Dec. 20, 1989, abandoned.

[51] Int. Cl.$^5$ .............................................. B01D 5/00
[52] U.S. Cl. ........................ 204/157.22; 204/157.2; 204/157.21; 423/DIG. 7
[58] Field of Search .......... 204/157.2, 157.21, 157.22; 423/DIG. 7

[56] References Cited

U.S. PATENT DOCUMENTS 5,061,353  10/1991  Grossman ................... 204/157.22

OTHER PUBLICATIONS

Yu et al., The Fonton-An App. for the Photochemical Separation of Mercury Isotopes, Sov. Phys Tech. Phys. 32 (8), pp. 979-982, 1987.
Webster et al. in J. Phys. Chem., 85 1302 (1981).
Gucker, Jr. et al., J. Am. Chem Soc., 59, 1275 (1937).

Primary Examiner—Brooks H. Hunt
Assistant Examiner—Ngoclan T. Mai
Attorney, Agent, or Firm—Robert E. Walter; Martha Ann Finnegan

[57] ABSTRACT

A method of removing deposited product from a photochemical reactor used in the enrichment of $^{196}$Hg has been developed and shown to be effective for rapid re-cycling of the reactor system. Unlike previous methods relatively low temperatures are used in a gas and vapor phase process of removal. Importantly, the recovery process is understood in a quantitative manner so that scaling design to larger capacity systems can be easily carried out.

1 Claim, 2 Drawing Sheets

AUTOMATED PRODUCT RECOVERY IN A HG-196 PHOTOCHEMICAL ISOTOPE SEPARATION PROCESS

STATEMENT OF GOVERNMENT SUPPORT

The Government of the United States of America has rights in this invention pursuant to Subcontract No. 4540710 under Prime Contract No. DE-AC03-76SF00098 awarded by the United States Department of Energy.

This is a continuation of copending application Ser. No. 453,444 filed on Dec. 20, 1989, now abandoned.

FIELD OF THE INVENTION

The present invention is related to mercury enrichment, particularly the photochemical enrichment of Hg-196 (the $^{196}$Hg isotope of Hg).

The present inventors have developed an apparatus and methodology that permit the practical removal of large quantities of $Hg_2Cl_2$ from a photochemical reactor using gas phase processes compatible with a gas phase isotope separation process. This invention allows rapid re-cycling of the system since no system components need be removed to restart the process once the product is removed.

BACKGROUND OF THE INVENTION

Prior to this invention, product recovery in a photochemical mercury enrichment process has typically and most conveniently been accomplished by the removal of the photochemical reactor and the conduction of an electrolytic recovery process to remove the $Hg_2Cl_2$ product from the reactor walls. Complete recovery of the enriched mercury would take place in a separate electrolytic tank with the reactor removed from the process. Unfortunately, this method requires a substantial amount of set-up time to replace reactors and re-initiate the starting sequence of the system.

Webster et al. in *J. Phys. Chem.*, 85, 1302 (1981), describe yet another thermal method for the removal of the product from the reactor wall in a photochemical mercury enrichment reactor. There the authors state that a 450° C. temperature is needed to sublime the $Hg_2Cl_2$ from the reactor wall to a cool collecting plate. In addition to the high temperature, this method also requires vacuum components which can sustain such high temperatures. Further, for large scale systems this method would require a large expenditure of energy to reach the necessary high temperature.

SUMMARY OF THE INVENTION

The present invention is based upon the careful study of the vapor pressure of $Hg_2Cl_2$ (see for example, Gucker, Jr. et al., *J. Am. Chem. Soc.*, 59, 1275 (1937)) and the present inventors have found that much lower temperatures can be used to remove the $Hg_2Cl_2$ than those previously suggested by Webster et al., supra.

Thus, the present invention is directed to a method of removing deposited product from a photochemical reactor used in the enrichment of $^{196}$Hg which has been found to be effective for rapid re-cycling of the reactor system. Unlike previous methods, relatively low temperatures are used in a gas and vapor phase process of removal. More importantly, the recovery process is described in a quantitative manner so that scaling design to larger capacity systems can be easily carried out.

The present invention is particularly directed to a semi-continuous automated process for the generation and recovery of enriched mercury formed in a photochemical mercury enrichment reactor, which comprises the following sequential steps:

(a) cleaning the components and assembling the reactor and product recovery assemblies;

(b) adjusting the reactor oven, evacuation of system, photochemical lamp/filter adjustment, loading of cold traps with liquid nitrogen $LN_2$;

(c) operating the reactor, loading HCl, He, and Hg feedstock through the reaction zone to produce product, at a reactor temperature of about 73° C.;

(d) switching from a first Hg product pre-trap to a second, wherein the second pre-trap is used for product condensation;

(e) adjusting the reactor temperature to about 120° C., adjusting the gas flow to about 2,000 sccm of helium, and transferring product from the reactor to the second pre-trap;

(f) placing the first mercury pre-trap back in stream and repeating steps (b)–(f) as a repeat of the process cycle.

DETAILED DESCRIPTION OF THE PREFERRED EMBODIMENT

Figure 1:
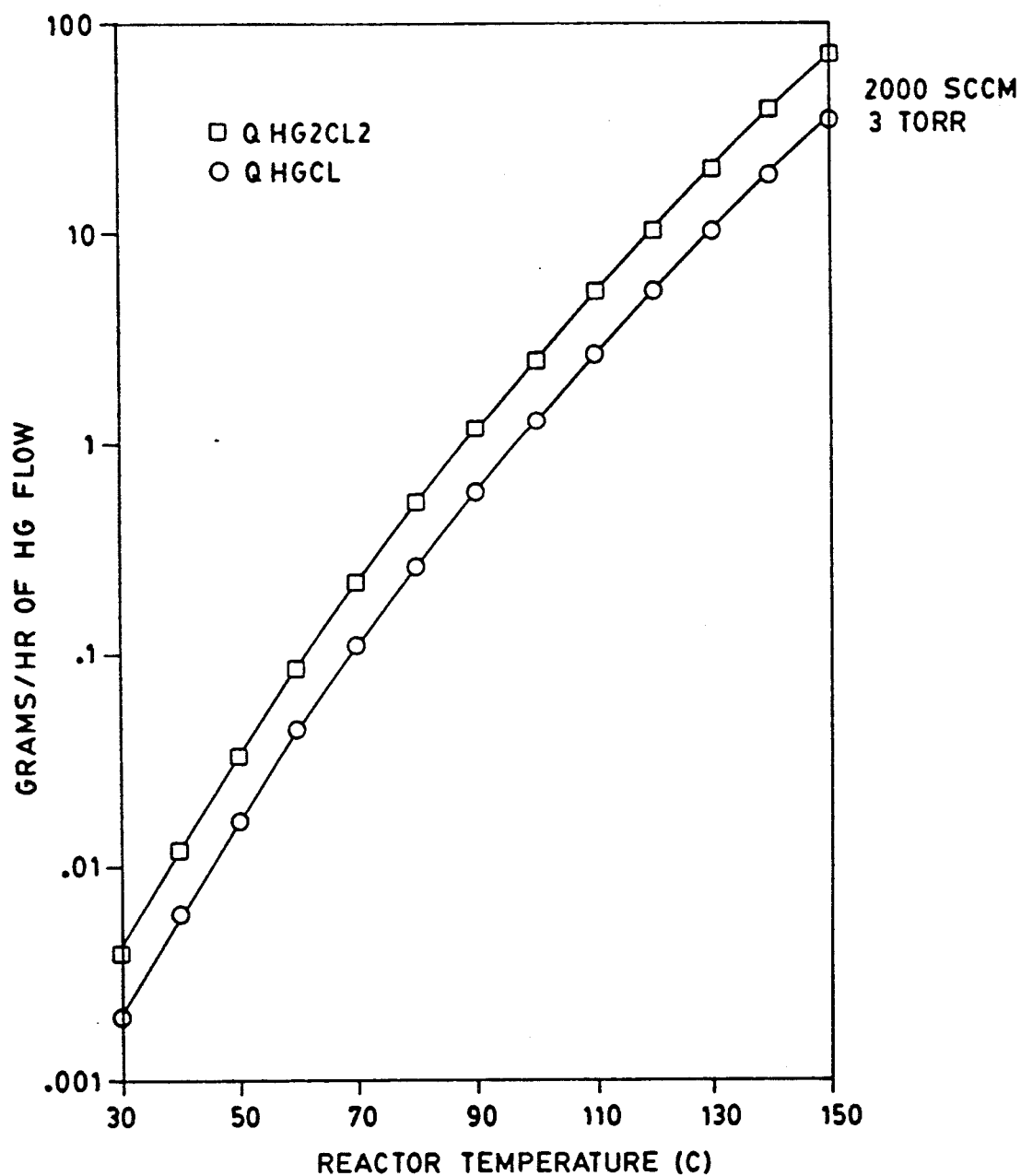
FIG. 1 illustrates $Hg_2Cl_2$ and HgCl product flow (in grams per hour) versus temperature of the reactor (in °C.).

In the method of the present invention a gas flow is used to entrain the $Hg_2Cl_2$ vapor in the photochemical reactor vessel. One especially preferred apparatus for use with this method is set forth in copending application, U.S. Pat. No. 07/526,952, filed May 21, 1990 which is a continuation application U.S. Ser. No. 07/289,849, filed Dec. 23, 1988, entitled "Method and Apparatus for Controlling the Flow Rate of Mercury in a Flow System", the disclosure of which is hereby incorporated herein by reference.

The same gas flow is likewise used to transport the $Hg_2Cl_2$ out of the reactor and into a product trap. This trap is advantageously isolated from the rest of the system so that the enrichment process may be restarted while a clean trap is installed or switched into place for use in the next product recovery cycle.

Several important points regarding this invention should be noted;

(1) The use of lower temperatures than those stated by Webster et al. as being required for product recovery (i.e., below 450° C.), allows for larger scale processing since it has been found that to produce the highest possible utilization of $^{196}$Hg in the feedstock increasing the length of the reactor will increase the utilization factor. One such preferred apparatus is described in copending application, U.S. Ser. No. 07/289,644, filed Dec. 23, 1988 now U.S. Pat. No. 4,981,565, issued Jan. 1, 1991, entitled "High Utilization Photochemical Reactor and Process for 196-Hg Enrichment", the disclosure of which is hereby incorporated herein by reference.

Therefore a substantial increase in complexity of the system could be expected using the technique described in Webster et al. compared to the present invention.

(2) The present inventors have found that higher temperatures produce surface contamination problems on the surface of the reactor which appear to be more easily avoided at lower process temperatures. While not wishing to be bound by theory or conjecture, it is believed that the skilled artisan will be more likely to find contamination problems at the Webster et al. temperature than with the temperature range of the present invention.

(3) Another point is that only copper metal gasket used with metal knife edge seals are commonly available for temperatures as high as 450° C. for the size systems typically used in mercury enrichment processes. These gaskets are not compatible with a process (such as the present one) in which anhydrous HCl is used. An alternative is to extend the reactor as a single piece through the high temperature region into a region of much lower temperature, 150° C. or less, avoiding any seals in the high temperature zone. This represents a design restriction not encountered in the present invention.

In the process and apparatus of the present invention, Viton "O" rings, for example, can be used safely and securely under the processing conditions described herein.

Using the data in Gucker, Jr. et al., for the vapor pressure of $Hg_2Cl_2$ as a function of temperature and the entrainment system described in Grossman et al., U.S. Ser. No. 07/289,849 supra, the rate of product flow out of the reactor can be estimated. The data from Gucker et al. was fit to give the following expression for the mercurous chloride vapor pressure:

$$ln_e P = 22.2 - (1.0 \times 10^4)/T$$

where

P = $Hg_2Cl_2$ vapor pressure in Torr
T = vapor solid temperature in degrees K

For perfect entrainment, plug flow, and ideal gas using the concepts discussed in U.S. Ser. No. 07/289,849, one can show that the flow of $Hg_2Cl_2$ through the system is given by $$Q = (Q_c/P_c) \times 4.47 \times 10^9 \times exp(-1.04 \times 10^4/Te)$$

where

Q = $Hg_2Cl_2$ molar flow rate
$Q_c$ = carrier gas molar flow rate
$P_c$ = carrier gas mean pressure in Torr
$T^c$ = carrier gas, product solid and vapor temperature in degrees K This is shown in FIG. 1. The reason for the two curves is that the upper curve corresponds to the vapor as $Hg_2Cl_2$ and the lower curve as HgCl. It is not yet clear in what form the product evaporates. The two curves represent a range of possible removal rates which is consistent with present observations.

Figure 2:
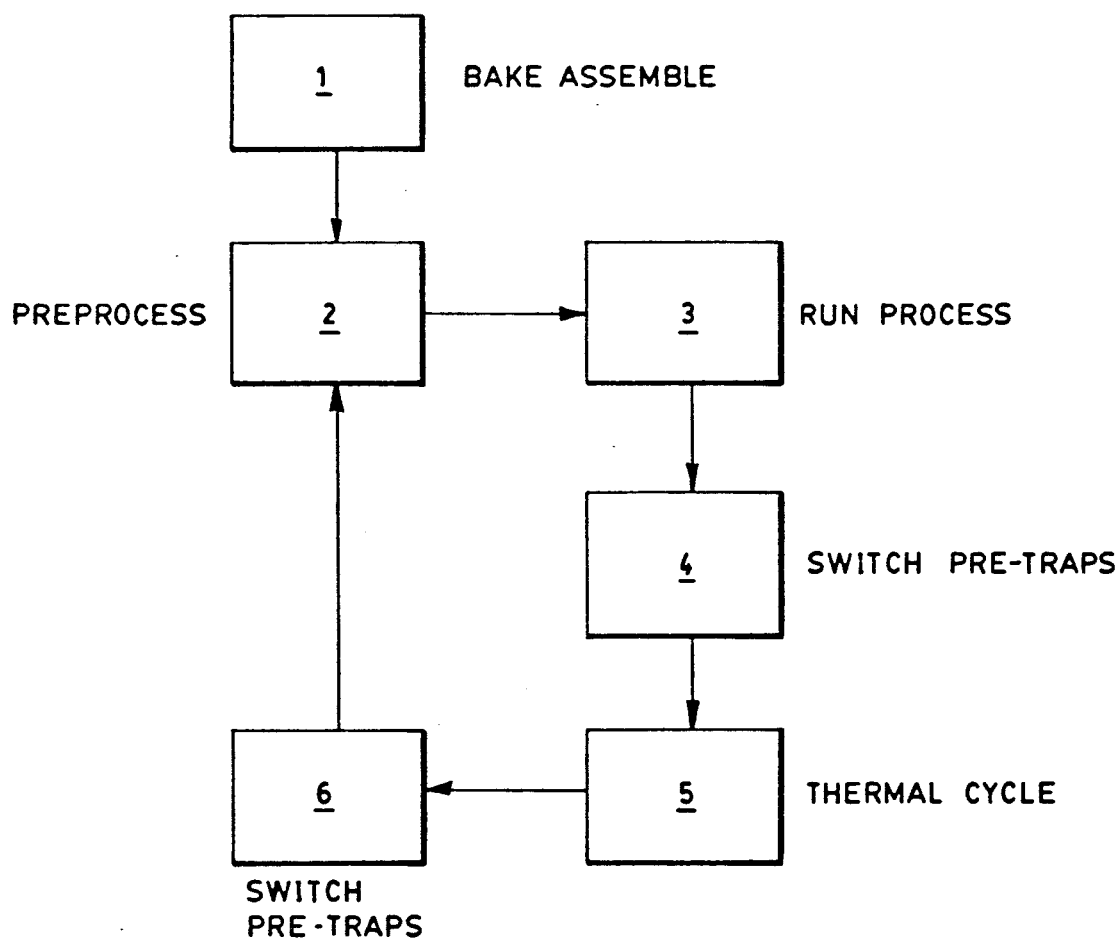
FIG. 2 illustrates a schematic diagram for a semi-continuous process for the isolation and recovery of $Hg_2Cl_2$ product from a photochemical reactor process.

FIG. 2 is a schematic diagram of the process of the present invention, wherein the reactor and pre-traps are kept in place during three separate photochemical runs.

Referring to FIG. 2, step 1 consists of cleaning of components and assembly. Step 2 corresponds to oven turn-on, evacuation of system, photochemical lamp/filter adjustment, loading of cold traps with $LN_2$, etc. Step 3 is running HCl, He, and Hg feedstock through the reaction zone to produce product. Here the reactor temperature is maintained at about 73° C. Step 4 switches from one Hg pre-trap to another. The second pre-trap is used for product condensation. In step 5 the reactor temperature is raised to 120° C. and gas flow of 2,000 sccm of helium is used to transfer all the product from the reactor surface to the second pre-trap. In step 6 the mercury pre-trap is back in stream and step 2 is the start of the process cycle.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A semi-continuous automated process for generating and recovering enriched mercury formed in a photochemical mercury enrichment reactor, said reactor comprising the following major components: a reactor oven, a reaction zone, a photochemical lamp and filter therefor, and a plurality of mercury pre-traps through which products of the mercury enrichment process flow, said process comprising the following sequential steps:

(a) cleaning the reactor components and assembling the reactor and product recovery assemblies;

(b) adjusting the photochemical reactor oven to obtain a predetermined first reactor temperature of about 73° C., evacuating the system, adjusting the photochemical lamp/filter to suitable conditions for generating enriched mercury in said photochemical mercury enrichment reactor, and loading said pre-traps with liquid nitrogen to create a product condensation temperature therein for the collection of enriched mercury;

(c) operating the reactor, loading HCl, and Hg feedstock through the reaction zone operating at the first reactor temperature, thereby generating an enriched mercury product;

(d) collecting the enriched mercury product in a first product pre-trap;

(e) when the first product pre-trap is full, switching from said first product pre-trap to a second product pre-trap by adjusting the reactor temperature to a second reaction temperature of about 120° C., and adjusting the gas flow to about 2,000 sccm of helium, and transferring product from the reactor to the second product pre-trap for the collection of enriched mercury, wherein the second product pre-trap is used for product condensation; and (f) removing the collected product from the first product pre-trap, placing the empty first product pre-trap back in stream and repeating steps (b)-(f) to repeat the process cycle for the recovery of additional enriched mercury.

* * * * *